No. 635,598. Patented Oct. 24, 1899.
L. L. ROWE.
BICYCLE SADDLE.
(Application filed Jan. 18, 1897.)

(No Model.) 2 Sheets—Sheet 1.

WITNESSES
J. M. Dolan.
L. A. Walsh.

INVENTOR
L. Larry Rowe
by his attys
Clarke & Raymond

No. 635,598. Patented Oct. 24, 1899.
L. L. ROWE.
BICYCLE SADDLE.
(Application filed Jan. 18, 1897.)
(No Model.) 2 Sheets—Sheet 2.

WITNESSES
J. Mc. Dolan
L. A. Walsh

INVENTOR
L. Leroy Rowe
by his attys
Clarke & Raymond

UNITED STATES PATENT OFFICE.

LEVI LEROY ROWE, OF BOSTON, MASSACHUSETTS.

BICYCLE-SADDLE.

SPECIFICATION forming part of Letters Patent No. 635,598, dated October 24, 1899.

Application filed January 18, 1897. Serial No. 619,577. (No model.)

*To all whom it may concern:*

Be it known that I, LEVI LEROY ROWE, a citizen of the United States, residing at Boston, in the county of Suffolk and State of Massachusetts, have invented a new and useful Improvement in Saddles for Bicycles, of which the following is a full, clear, and exact description, reference being had to the accompanying drawings, forming a part of this specification, in explaining its nature.

The invention comprises a bicycle-saddle in two parts or sections attached at their forward ends only by a single pivot common to both or by separate pivots to a common support in a manner to permit each section to be independently moved horizontally upon said pivot toward the other section, the two sections being disconnected excepting so far as they are combined with a common spring which acts against each and restores each to its normal position or the position farthest removed from a mean central line of the saddle-support extending from the front to the rear thereof.

The object of the invention is to provide a saddle that shall accommodate itself automatically to the movements of the legs of the rider and whereby upon the downward movement of one leg in the act of pushing the pedal down the section or part of the saddle upon that side will automatically yield inwardly horizontally and so that the outer edge of the said section, being the edge with which the leg of the rider is in contact, will not act to chafe the leg of the rider as it straightens, but will yield inwardly to accommodate itself to such change in the inclination and position of the leg, and the saddle is also so constructed that each section will thus respond to the leg action of the rider and will automatically resume its original position while the leg of the rider is being lifted. In order that this structure may be effective, it is necessary that each section should be pivoted at or near its forward end, that the forward end of each section should be narrow, and that they should be supported at their forward ends only and by means which will create as little friction as possible as they are moved. I consequently prefer to use ball-bearings in conjunction with the pivots and also to employ as light a returning-spring as it is feasible to use.

Figure 1:
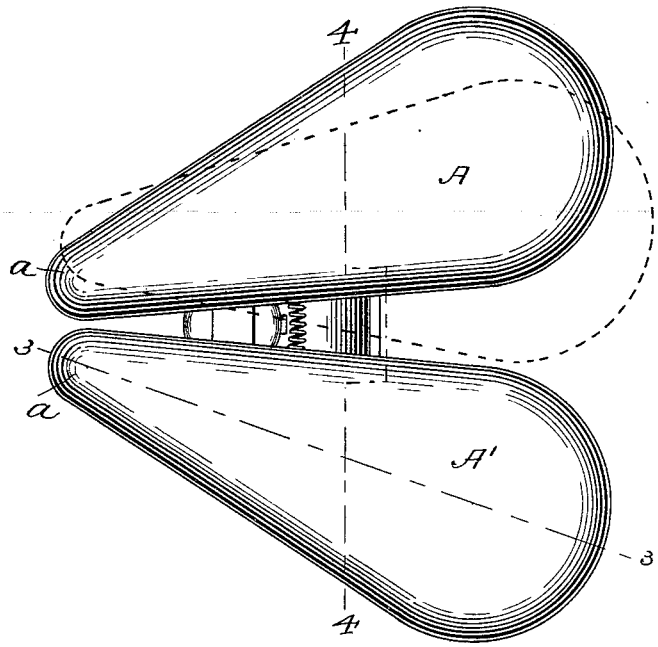
Figure 2:
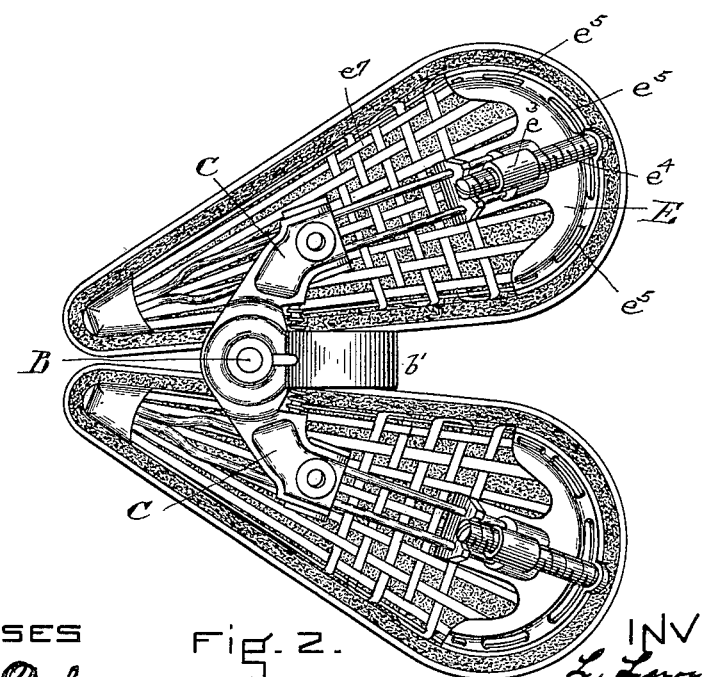
Figure 3:
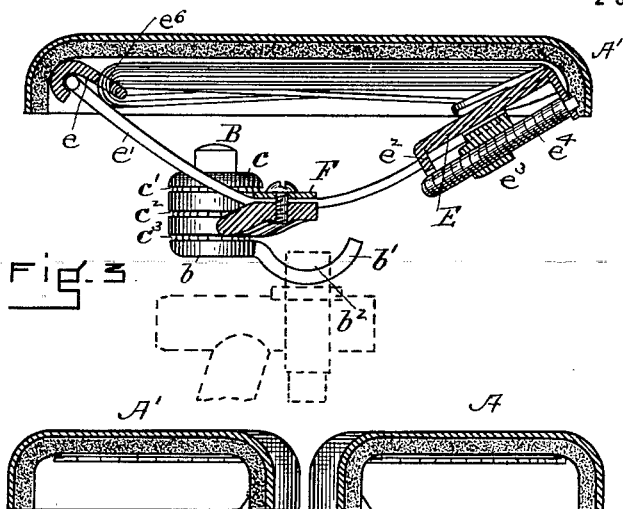
Figure 4:
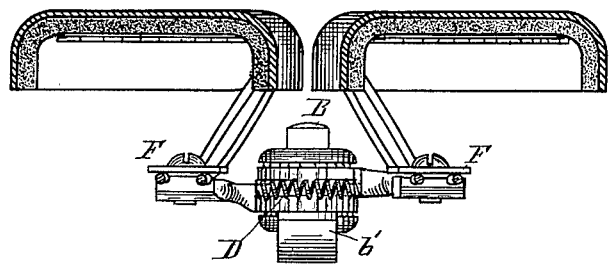
Figure 5:
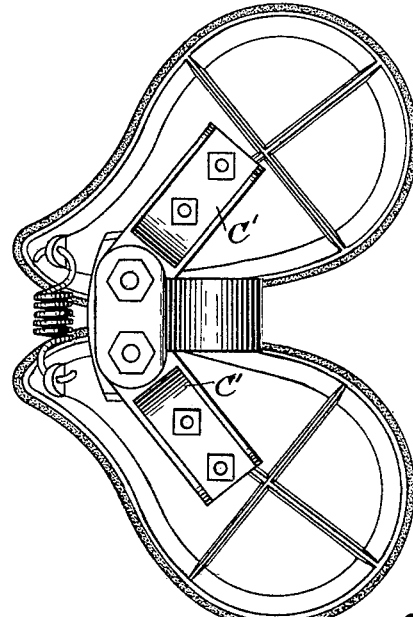

In the drawings, Figure 1 is a view in plan of the saddle, one section thereof being shown by dotted outline in the position in which it is adapted to be moved by the leg of the rider as the pedal upon that side is moved downward. Fig. 2 is a view in inverted plan of said saddle. Fig. 3 is a view of said saddle upon the dotted line 3 3 of Fig. 1. Fig. 4 is a view in section upon the dotted line 4 4 of Fig. 1. Fig 5 is a view in plan, inverted, of a modified form of the invention.

A A' are the two parts or sections of the saddle. They each in plan have a narrow front section $a$, widening gradually to the rear end, which is preferably rounded. Each saddle-section is pivoted at B to the plate, tongue, or support $b$, preferably having the curved end $b'$, adapted to be engaged and held by a clamp $b^2$, each seat having an arm C, to the outer end of which it is preferably adjustably attached, and the inner ends of which are shaped to bring one over the other and are each provided with a pivot-hole and a ball-holding track, and they are combined with the central pivot, an upper plate $c$, having a section of a ball-holding track, and the plate, tongue, or support $b$, having a section of a ball-holding track, balls being interposed between the various parts at $c'$, $c^2$, and $c^3$. (See Fig. 3.) The ball-bearings are used to permit the movements of the two sections with as little friction as possible, but of course are not essential.

A spring D is arranged between the two arms C, back of the pivot, the ends of which are supported upon short studs extending laterally therefrom, and which spring serves to hold the members or parts of the saddle separated and to return each member after it has been moved from the position represented by full lines in Fig. 1 to the position represented by dotted lines back to the full-line position.

Each part of the saddle represented in Figs. 1 to 4 has a rear support and straining-plate E and a narrow front hanger $e$. The front hanger is attached to the forward ends of the curved rods $e'$, and the rear ends of these rods pass through holes in an ear $e^2$ in the straining-plate and carry at their ends a nut $e^3$, in which a screw $e^4$ screws, the end of the screw bearing against the straining-plate. The turning of this screw moves the plate away from or toward the ends of the rods, and the tongue of the plate rests upon the ends of the rods or their joining-piece at their ends and with which the nut is integral. The straining-piece has lacing-holes $e^5$, through which and the loop $e^6$ in the front hanger $e$ a lacing $e^7$ is adapted to be passed back and forth to form a laced seat, and the frame and seat thus formed may be covered with a combined felt and leather covering, the edges of which extend downward about the frame and which are united thereto by a socket in the forward end thereof which closes over the front hanger $e$. (See Fig. 2.) Each seat-section is made adjustable upon its arm C by means of the clamp F, which comprises a plate bearing upon the upper surface of the rods $e'$ and a screw extending through a hole in the plate into the arm. By loosening the screw the position of the saddle-section may be moved in respect to the said arm.

In Fig. 5 each section of the saddle is represented as being connected to its supporting-plate $b$ by a separate pivot, which may be combined with the ends of the connecting-arms C', the equivalent of the arms C, by ball-bearings, if desired. The sections herein shown have metal seats, which are covered with cushions, and the spring for separating them is represented as connecting their forward ends.

It will be seen from what I have said that each section of the saddle is independently pivoted near its forward end to a support, that the pivotal point may be between the forward ends, as represented in Fig. 2, or may be removed somewhat therefrom, as represented in Fig. 5, that this pivotal connection is the only support which each section of the saddle has, that this permits each section of the saddle to be freely moved horizontally and inwardly from behind its pivotal point without in any way changing the position of the other member of the saddle or influencing its action, and that each saddle-section so moved acts to relieve the leg of the rider and prevents chafing, and that a light spring is employed to restore each section to its original position after it has been so moved, that this spring may be common to both sections or each section may be moved by an independent or separate spring.

Having thus fully described my invention, I claim and desire to secure by Letters Patent of the United States—

1. A bicycle-saddle consisting of two independent seat-sections arranged side by side, separated from each other, each of which is narrow at its front end and increases in width to its rear end, and each of which is pivoted at or near its front end to a seat-support, its said pivot being the sole connection between it and said support, and whereby said sections are adapted to be moved laterally alternately by the legs of the rider in the act of pedaling.

2. A bicycle-saddle consisting of two independent seat-sections arranged side by side, separated from each other, each of which is narrow at its front end and increases in width to its rear end, and each of which is pivoted at or near its front end to a seat-support, its said pivot being the sole connection between it and said support, and whereby said sections are adapted to be moved laterally alternately by the legs of the rider in the act of pedaling, and a light spring bearing against each seat-section and adapted to be slightly compressed by the lateral movement of said seat-section in one direction, and to act against said seat-section to move it in the opposite direction.

L. LEROY ROWE.

Witnesses:
F. F. RAYMOND, 2d,
J. M. DOLAN.